United States Patent
Cui et al.

[11] Patent Number: 6,167,340
[45] Date of Patent: Dec. 26, 2000

[54] METHOD AND SYSTEM FOR FILTERING A SPEED SIGNAL IN CONTROLLING A SPEED OF A VEHICLE

[75] Inventors: Xainzhong John Cui, Canton, Mich.; Matti K. Vint, Bridgeman Down, Australia

[73] Assignee: Visteon Global Technologies, Inc., Dearborn, Mich.

[21] Appl. No.: 09/118,874

[22] Filed: Jul. 20, 1998

[51] Int. Cl.[7] ...................................................... B60T 8/32
[52] U.S. Cl. .............................. 701/93; 701/96; 303/121; 303/183
[58] Field of Search ................................ 701/93, 110, 71, 701/96; 73/116, 117.3; 477/94, 118, 144, 901; 303/183, 184, 185, 121; 123/436

[56] References Cited

U.S. PATENT DOCUMENTS 5,012,417  4/1991  Watanabe et al. ........................ 701/71

*Primary Examiner*—Tan Nguyen
*Assistant Examiner*—Yonel Beaulieu
*Attorney, Agent, or Firm*—Rhonda McCoy-Pfau

[57]  ABSTRACT

A method and a speed control system for controlling a speed of a vehicle utilizes a speed sensor for sensing a speed of the vehicle and generating a corresponding speed signal. A control unit determines one of a quick or slow acceleration status of the vehicle based on the speed signal. The control unit also determines a mode of operation of the speed control system and filters the speed signal based on the acceleration status and the mode of operation of the speed control system. The speed of the vehicle is then controlled based on the filtered speed signal.

23 Claims, 6 Drawing Sheets

METHOD AND SYSTEM FOR FILTERING A SPEED SIGNAL IN CONTROLLING A SPEED OF A VEHICLE

TECHNICAL FIELD

This invention relates to methods and systems for filtering a speed signal in controlling a speed of a vehicle.

BACKGROUND ART

Speed control, or cruise control, systems keep the speed of the vehicle at a level set by the driver without the driver having to maintain pressure on the gas pedal. The driver can then cruise at a fixed speed without continually checking the speedometer.

The driver brings the vehicle up to a desired speed and turns on the cruise control. The driver then programs that speed into the system by pressing a button. An electronic sensor measures the speed at which the vehicle is traveling. A computing device differentiates between the information it receives about the actual speed and the desired speed that the driver programmed into it. The computer then sends a signal to a servo to set the throttle so that the torque generated by the engine is at the level needed to have the vehicle travel at the desired speed.

A problem with current speed control systems, however, is that the driver may perceive a deviation between the speed of the vehicle via the speedometer and the desired speed. This is due to the fact that the vehicle speed sensed by the electronic sensor is filtered via a filter that has a fast response as requested by the vehicle speed controller, while the speedometer has a slow response to the speed change. It is difficult to design a filter to compromise between the two different requirements on response time.

DISCLOSURE OF THE INVENTION

It is thus a general object of the present invention to provide a method and system of filtering a speed signal for accurately controlling the speed of a vehicle according to a desired speed set by the driver in a simple and efficient manner.

In carrying out the above object and other objects, features, and advantages of the present invention, a method is provided for filtering a speed signal in controlling a speed of a vehicle having a speed control system. A speed of the vehicle is sensed and a corresponding speed signal is generated. An acceleration status of the vehicle is determined based on the speed signal wherein the acceleration status is either quick or slow. A mode of operation of the speed control system is determined. The speed signal is then filtered based on the acceleration status and the mode of operation and a corresponding filtered speed signal is generated. Finally, the speed of the vehicle is controlled based on the filtered speed signal.

In further carrying out the above object and other objects, features, and advantages of the present invention, a system is also provided for carrying out the steps of the above described method. The system includes a sensor for sensing a speed of the vehicle and generating a corresponding speed signal. The system also includes a control unit for determining an acceleration status of the vehicle based on the speed signal, determining a mode of operation of the speed control system, filtering the speed signal based on the acceleration status and the mode of operation, generating a corresponding filtered speed signal, and controlling the speed of the vehicle based on the filtered speed signal.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
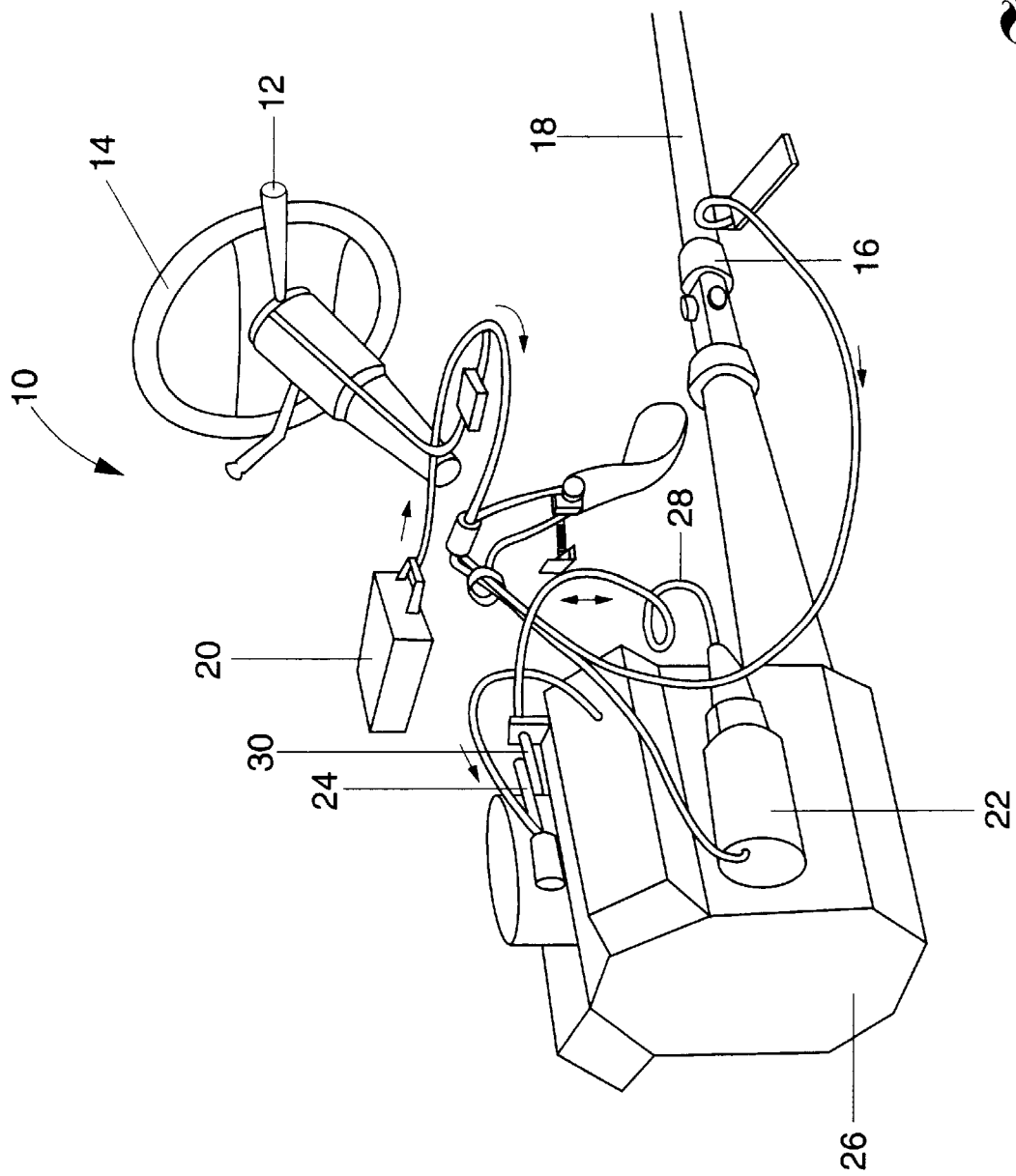
FIG. 1 is a schematic diagram of a speed control system for an automotive vehicle.

Turning now to FIG. 1, there is shown a schematic diagram of a speed control system, denoted generally by reference numeral 10, according to the present invention for controlling the speed of an automotive vehicle. The system 10 includes a speed control switch array 12 for activating and controlling the system 10 of the present invention. The speed control switch array 12 may be incorporated onto a turn indicator lever, as shown in FIG. 1, on the steering wheel 14, or on the instrument panel (not shown). The speed control switch array 12 includes a switch for turning speed control ON/OFF, and other switches for setting the desired speed, accelerating and decelerating the speed of the vehicle while remaining in speed control operation, and causing the vehicle to enter the acceleration or deceleration mode until the prior vehicle set speed has been attained.

A vehicle speed sensor 16 is preferably secured to a drive shaft 18 of the vehicle. In this case, the speed sensor 16 consists of magnets and a pickup coil. The magnets typically have four poles positioned 90 degrees apart on the vehicle's drive shaft 18. As the magnets turn with the shaft 18, they pass across the face of the pickup coil, permitting the pickup coil to sense the speed at which the drive shaft 18 is revolving. Alternatively, the speed sensor may comprise wheel speed sensors coupled to the wheels (not shown) of the vehicle.

The speed signal from the speed sensor 16 is sent to a control unit 20 which compares the speed of the drive shaft 16 (which is directly related to the speed of the vehicle) with the desired speed programmed into the control unit 20 by the driver via the switch array 12. When the two speed signals are not the same, the control unit 20 sends a signal to a servo 22 to alter the speed of the vehicle.

The servo 22 causes a throttle valve 24 which allows an engine 26 to take in more or less air. The servo 22 is connected by a cable 28 to a throttle valve linkage 30 of the engine's air supply system. The cable 28 moves the throttle valve 24 according to the movement initiated by the servo 22.

The principles outlined in this invention are based on the fact that there may be a difference between the actual vehicle speed and the speed calculated from a speed sensor. The calculated speed only approximates the actual speed, and its accuracy depends on the resolution of the speed sensor 16 and the filtering algorithms employed to reject speed signal noise.

Figure 2:
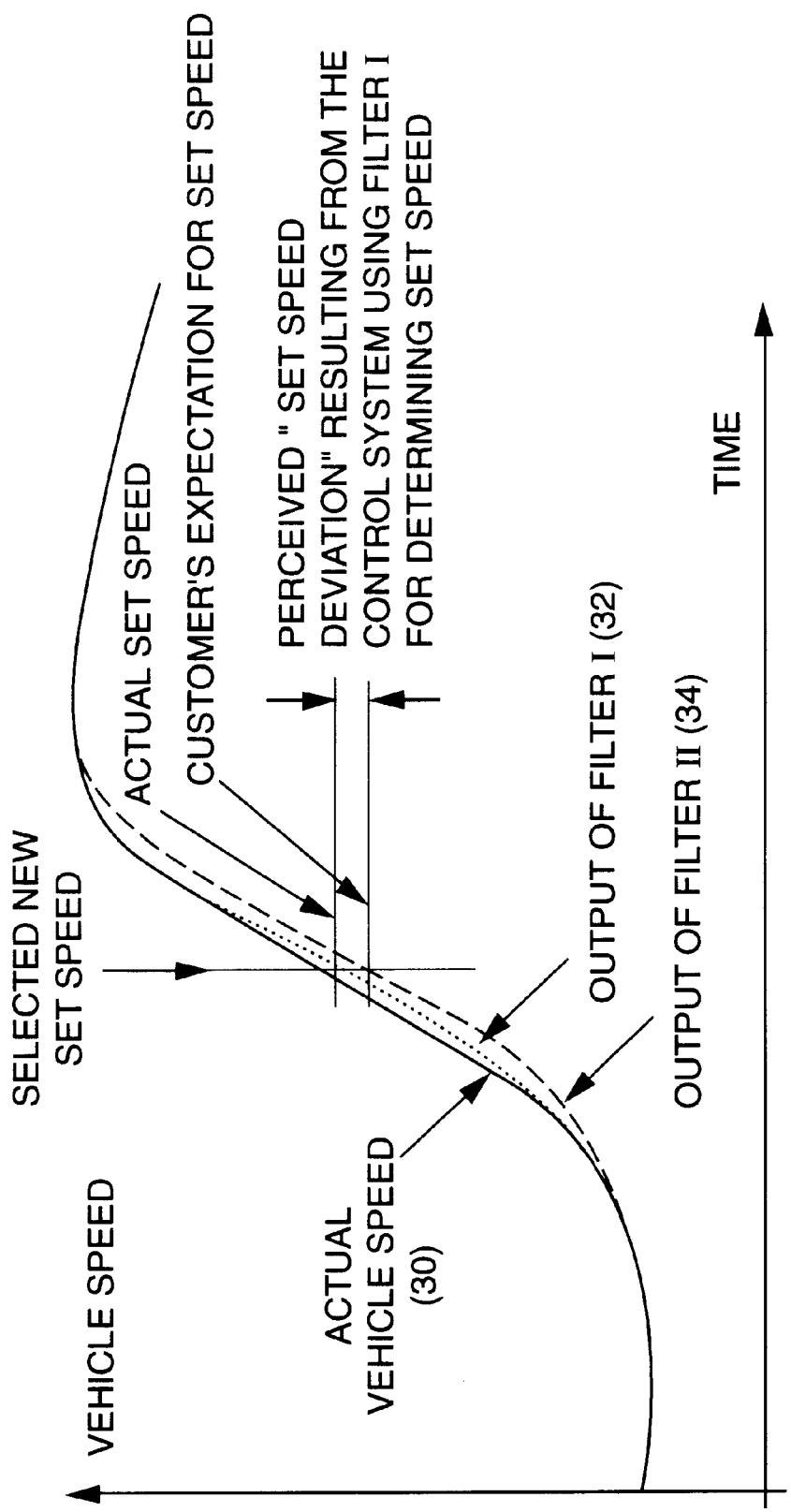
FIG. 2 is a graph illustrating the various filtered speeds utilized in the speed control system of the present invention.

There are two distinct filtered speeds that are of interest for optimizing speed control performance as shown in FIG. 2. A representative of the actual vehicle speed is shown at 30. A speed signal filtered according to a quick response filter is shown at 32, while a second speed signal filtered according to a slow response filter is shown at 34. The speed signal 32 is filtered (Filter I) so as to provide a quick response as the speed control unit 20 adjusts the position of the throttle valve 24 in order to minimize speed deviation during speed control operation and to provide adequate noise rejection without adding significant delay to the actual speed. The speed signal 34 is filtered (Filter II) so as to provide a close representation of the speed that is visually indicated on the speedometer (not shown) on the vehicle.

Typically, there is a difference between the requirements of Filter I and Filter II. Speed control system 10 uses a speed filter with quick response for any speed change. However, the speed signal feeds to the speedometer are usually filtered more significantly to minimize speedometer needle jitter or waver. If a single speed filter is employed, it typically has performance somewhere between Filter I and Filter II.

If the speed filter of the speed control system 10 is designed to have a response close to that of Filter I, then the speed filter has a quick response to speed changes so that the control unit 20 is better able to adjust the throttle valve 24 position to minimize speed variations. However, if a driver sets a desired vehicle speed when the vehicle speed is changing rapidly, the driver may perceive that the system set a speed slightly different than the speed desired. This typically occurs during SET operation (i.e., set a desired speed for speed control), end of ACCEL operation (i.e., end of acceleration in speed control), or end of COAST operation (end of deceleration in speed control). The reason is that the driver may observe the speed on the speedometer to lag behind the actual vehicle speed, while the speed filter tracks closely to the actual vehicle speed as shown in FIG. 2.

For example, during an ACCEL operation, at the moment that the COAST switch is released (i.e., end of COAST in speed control), a new speed is selected. However, the speed filter output at this moment may be as much as 1 mph lower than the speed indicated by the speedometer. Therefore, as the speed control system 10 stabilizes at the new set speed, the driver may perceive as much as a "1 mph set speed deviation" since he/she may believe that the system set a speed 1 mph lower than he/she had selected as reading the speedometer.

Thus, the speed control system 10 tracks the target speed accurately. However, it is difficult for a driver to set the speed accurately unless he/she knows the different responses between the speed filter for the speed control system 10 and the signal used for the speedometer and compensates for the difference when setting the desired speed.

On the other hand, if the filter is designed to have a response close to that of Filter II, the filter may not respond as quickly as desired due to the time lag between the speed filter output and the actual vehicle speed.

The benefit to this approach, however, is that there is even a more negligible perceived difference between the driver selected set speed for speed control operation and the reading on the speedometer. Thus, the driver will conclude that the speed control system 10 tracks the set speed very accurately.

To enhance the performance of the speed control system 10, it is thus desirable to provide a speed filter to address both requirements of the speed control system 10 and the speedometer when a set speed is selected while the actual vehicle speed is changing rapidly. It is also desirable to provide a speed filter to satisfy the requirements of the speed control system 10 for normal speed control operations in order to improve the performance of the speed control system 10. These objectives can be achieved utilizing two approaches or concepts.

Figure 3:
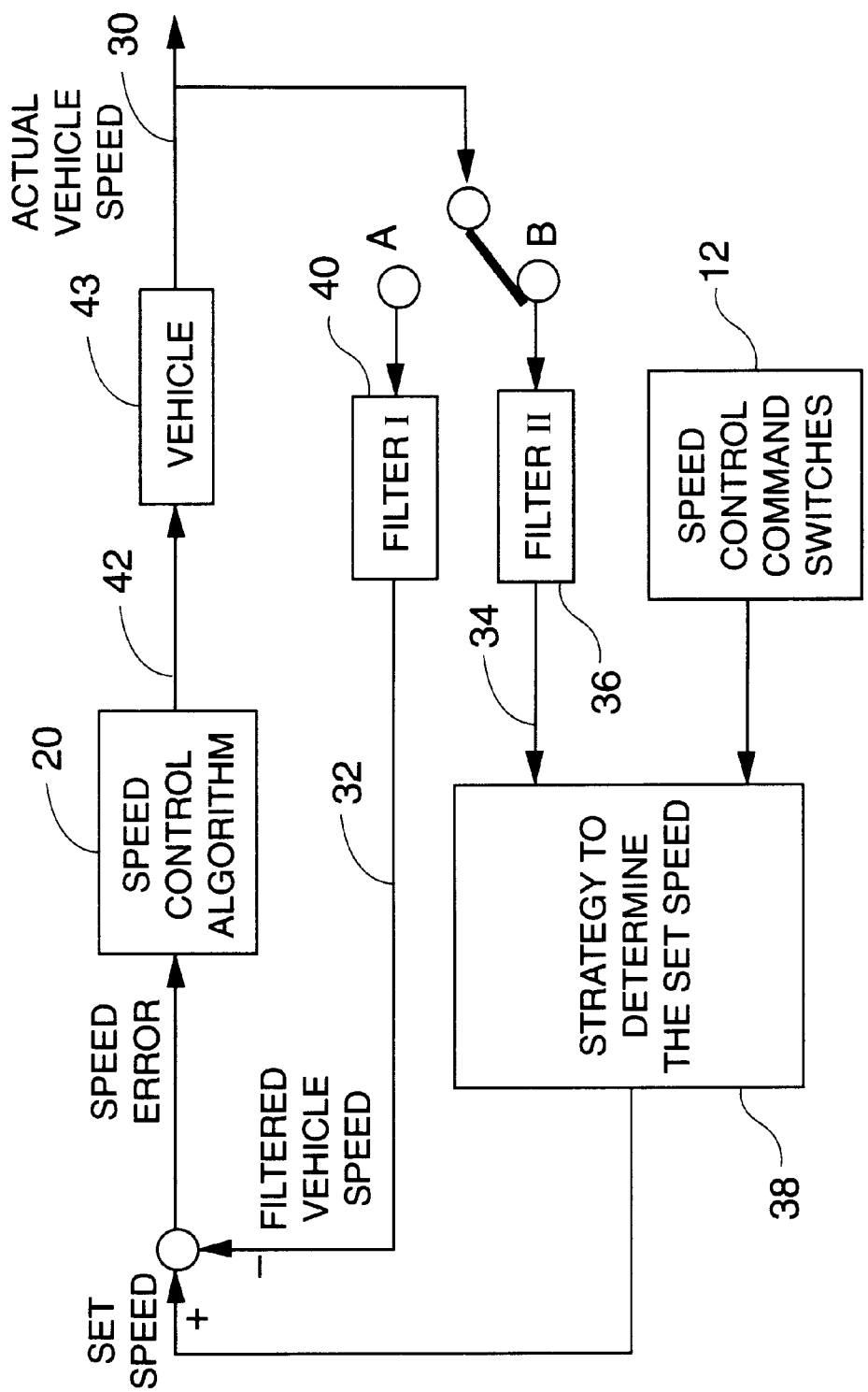
FIG. 3 is a block diagram illustrating the first speed filter logic employed in the present invention.

The first concept, as illustrated in the block diagram of FIG. 3, utilizes the quick response Filter I for all speed control operations for calculating speed error and subsequent control action to the throttle valve 24. The slower response of Filter II is then used to determine the set speed at the moment when a command is received from the switch array 12 (e.g., SET command, end of ACCEL command, or end of COAST command).

Thus, at the time to engage the speed control system 10 as commanded by the switches 12, the speed signal 30 is filtered via Filter II 36. Based on the output signal 34 from Filter II 36 and the command received from switches 12, the new set speed is determined at block 38. After the new set speed is selected, the speed signal 30 is filtered via Filter I 40 to produce a filtered speed signal 32. The error between the set speed and the filtered speed is determined, and the control unit 20 generates a control signal 42 accordingly, which is used to control the vehicle represented by block 43.

Figure 4:
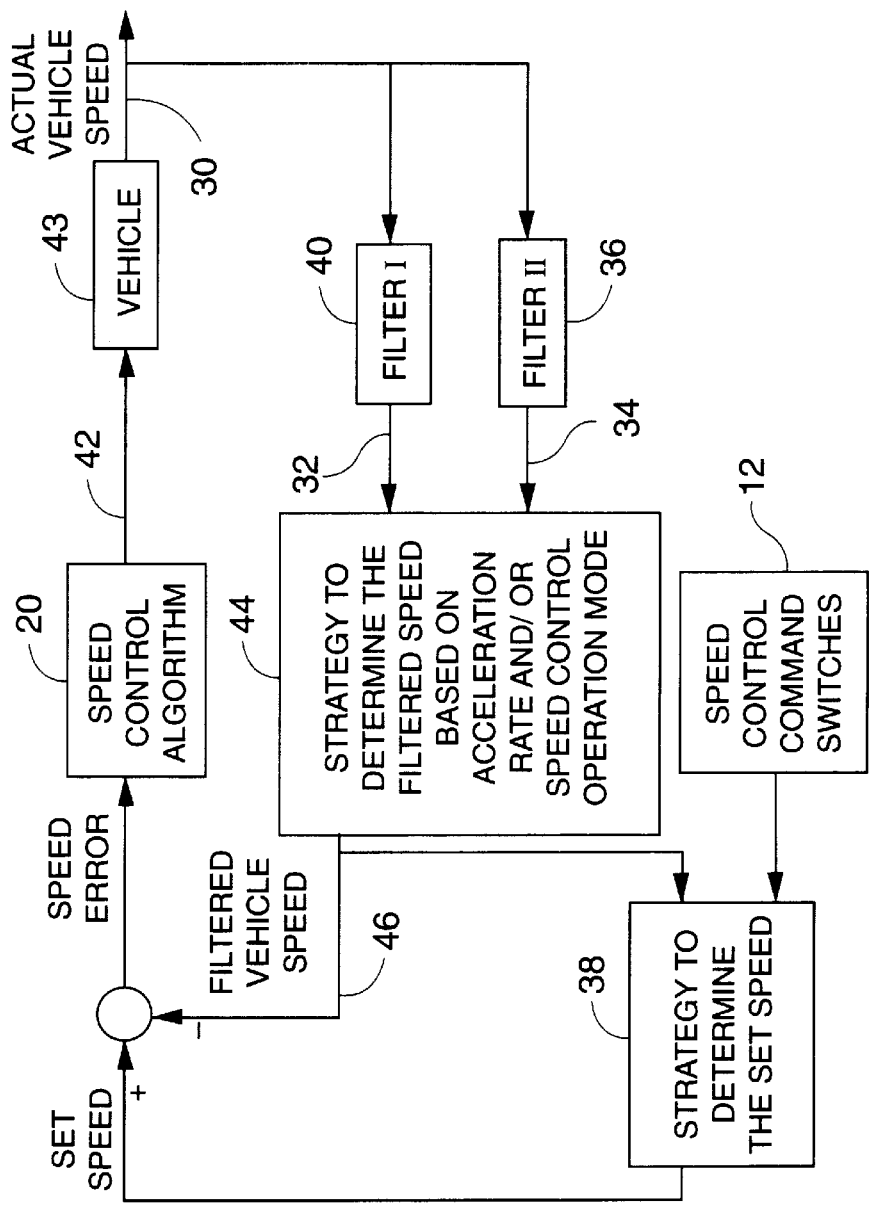
FIG. 4 is a block diagram illustrating the second speed filter logic employed in the present invention.

Turning now to FIG. 4, there is shown the second concept of the present invention. In this case, the quick response Filter I is used for all operations (control and determining set speed) where the speed is changing slowly. The slower response Filter II, on the other hand, is used for all operations (control and determining set speed) where the speed is changing quickly and a new set speed is required. For this concept, the speed filters are selected by monitoring the vehicle acceleration status and speed control operation modes. For example, Filter II may be used when the speed is controlled by a driver manually, during speed control coast operation, or ACCEL operation, since the vehicle acceleration is typically quick in these cases.

As shown in FIG. 4, the actual speed signal 30 is filtered by both Filter I 40 and Filter II 36. A strategy is then implemented at 44 to determine which filtered speed to use based on the acceleration status and/or speed control operation mode, and then a new filtered speed signal 46 is generated. The set speed, as determined at block 38, is compared to the new filtered speed signal 46 to obtain the error signal for use by the control unit 20.

Figure 5:
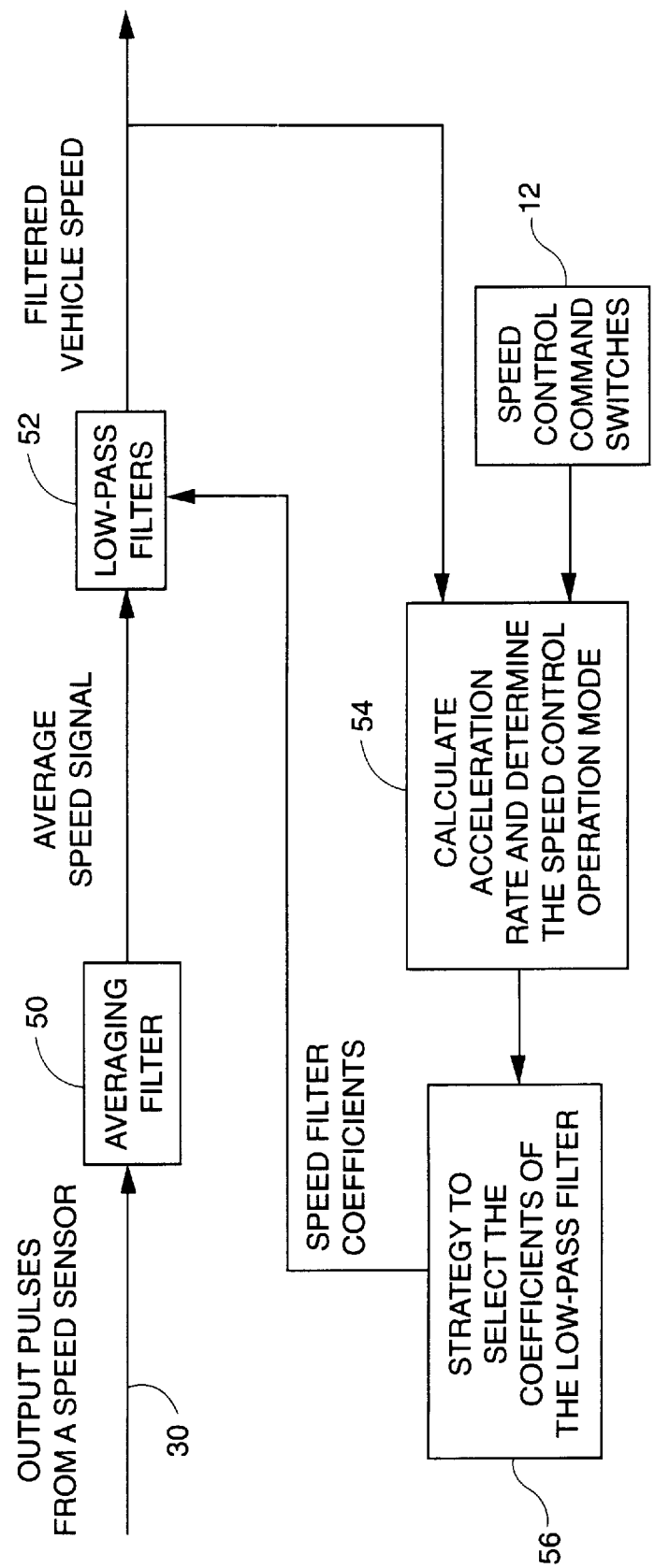
FIG. 5 is a block diagram illustrating the filtering process of the present invention utilized in a speed control system.

Turning now to FIG. 5, there is shown a block diagram illustrating the implementation of Filter I and Filter II used in both of the concepts illustrated in FIGS. 3 and 4. A cascaded two-stage filter design is utilized for the speed signal 30 from the sensor 16. As shown in FIG. 5, the first stage is a moving average process, block 50, to filter the speed signal 30 from the sensor 16. This output is then fed into two low-pass filters 52 designed with the performance of Filter I and Filter II described above.

As discussed above, the actual vehicle speed signal 30 is preliminarily filtered using a moving average filter 50. The multiple samples of pulses per complete revolution of the sensor 16 is used to compute the moving average. For example, for a four-pole speed sensor, a four-moving average process is as follows. If $\Delta t(k)$ is the measured time interval at time k, then the moving average process is described by:

$$\Delta T(k) = \frac{1}{4}\sum_{i=0}^{3} \Delta t(k-i) \quad k > 3. \qquad (1)$$

By this moving average process, the averaged time interval $\Delta T(k)$ is updated when each pulse is measured. Moreover, it is not necessary to calibrate for different vehicle models or speed sensors 16. Therefore, it provides great flexibility in tuning the filters designed in the second filtering stage, described below, to match the characteristic desired for either Filter I or Filter II.

The performance characteristics of Filter I and Filter II are obtained with two low-pass filters 52 with two different cut-off frequencies. The input to the low-pass filter 52 is the averaged time interval $\Delta T(k)$. The general form of the low-pass filter 52 described in discrete time domain is as follows:

$$T(k) = a(\Delta T(k) + \Delta T(k-1)) + b\, T(k-1). \qquad (2)$$

T(k) is the final filtered time interval used to compute vehicle speed, $v_f(k)$. Coefficients a and b are derived according to a specified cut-off frequency, and can be varied to provide the required performance characteristics of Filter I or Filter II.

The filtered speed signal and the input from switch 12 are input to block 54 so that the acceleration status of the vehicle and the operation mode of the speed control system 10 can be determined. Based on this information, the desired filter coefficients, i.e., Filter I or Filter II, are determined at block 56.

It is desirable to have a smooth transition between using Filter I and Filter II by slowing down the convergence process of the vehicle speed to a new set speed. Let $$e(k) = v_d(k) - v_f(k) \qquad (3)$$

represent the speed error at time k, where $v_d(k)$ and $v_f(k)$ are the desired speed and filtered vehicle speed, respectively. Then one method to smooth the transition process is to limit the maximum changes of the speed error in one sample interval. For example, the following rule can be utilized:

$$If\, |e(k) - e(k-1)| > 2 \text{ mph}, \qquad (4)$$

then set e(k)=2 mph or e(k)=−2 mph according to the original sign of the speed error e(k).

Figure 6:
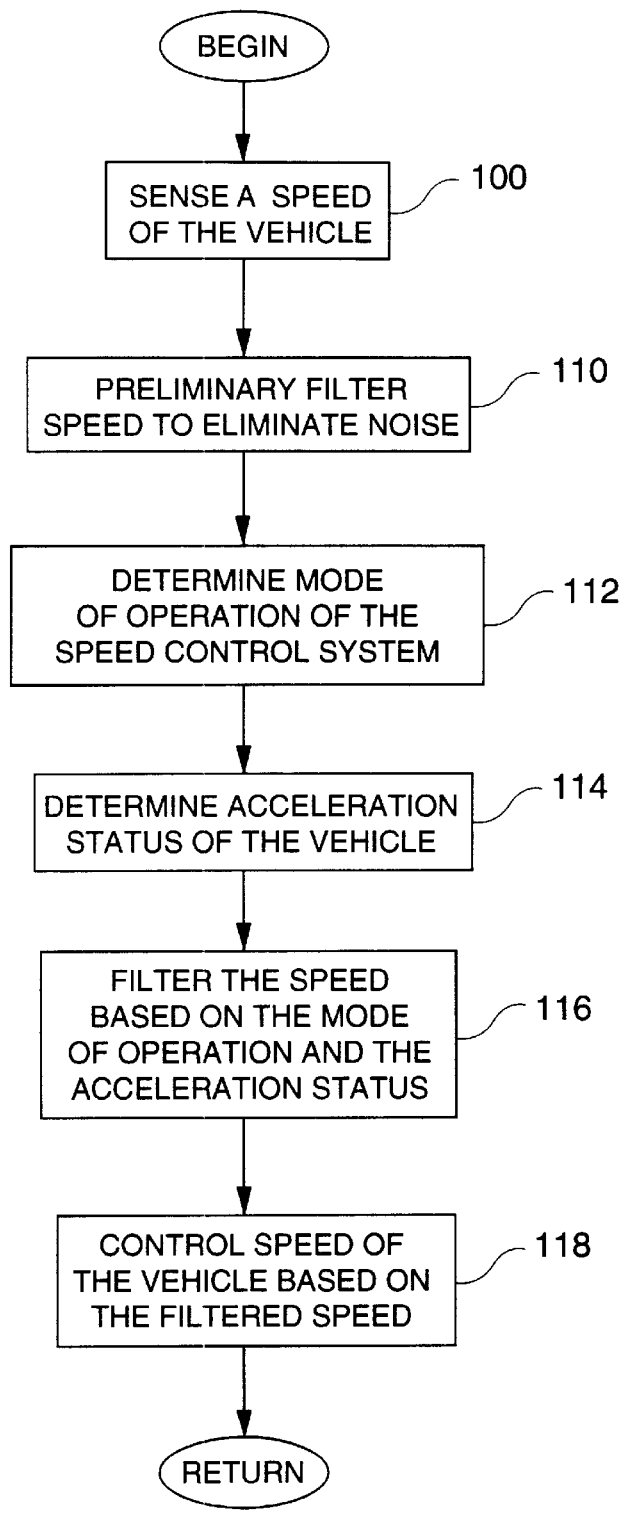
FIG. 6 is a flow diagram illustrating the general sequence of steps associated with the present invention.

Turning now to FIG. 6, there is shown a flow diagram illustrating the general sequence of steps associated with the method of the present invention. The method begins with the step of sensing a speed of the vehicle and generating a corresponding speed signal, as shown at block 100. The speed signal is then preliminarily filtered to remove noise, as shown at block 110.

Next, the mode of operation of the speed control system 10 is determined, as shown at block 112. The mode of operation may be any one of the following modes: set vehicle speed, accelerate vehicle speed, decelerate vehicle speed, resume vehicle speed, or cancel the speed control. The acceleration status of the vehicle is then determined, as shown at block 114. The speed signal is examined to determine whether vehicle speed is changing slowly or quickly.

Next, the preliminarily filtered speed signal is filtered again based on the mode of operation of the speed control system 10 and the acceleration status of the vehicle, as shown at block 116. Filtering the speed signal according to Filter I or Filter II is determined based on the acceleration status and operation modes as described above.

The speed of the vehicle is then controlled based on the filtered speed signal, as shown at block 118. The vehicle speed set by the driver is compared to the filtered speed signal to obtain an error signal. The control unit 20 then controls the throttle valve 24 based on the difference between the set speed and the filtered speed. This process continues as long as the driver has the speed control system 10 activated.

Thus, the present invention provides a variable filter and a method of utilizing this filter in vehicle speed control. The filter can be tuned to provide the desired characteristics of either a quick response filter or a slow response filter in considering different speed control operation modes and vehicle acceleration status. The cascaded filter design of the present invention also provides excellent noise rejection for both high frequency noise and noise related to geometric variations in the speed sensor poles.

While the best modes for carrying out the invention have been described in detail, those familiar with the art to which this invention relates will recognize various alternative designs and embodiments for practicing the invention as defined by the following claims.

What is claimed is:

1. A method for processing a speed signal for controlling a speed of a vehicle having a speed control system and a speedometer to eliminate driver perceived error between a desired target speed indicated on the speedometer and a target speed stored by the speed control system, the method comprising:

sensing a speed of the vehicle and generating a corresponding speed signal;

determining an acceleration status of the vehicle based on the speed signal, the acceleration status being one of quick and slow;

determining a mode of operation of the speed control system, the mode of operation including set vehicle speed, accel, and coast modes;

filtering the speed signal based on the acceleration status and the mode of operation and generating a corresponding filtered speed signal to eliminate driver perceived error between the filtered speed signal and the speedometer; and controlling the speed of the vehicle based on the filtered speed signal.

2. The method as recited in claim 1 wherein sensing the speed of the vehicle includes preliminarily filtering the speed signal to eliminate noise in the speed signal.

3. The method as recited in claim 2 wherein preliminarily filtering includes calculating a moving average of the speed signal.

4. The method as recited in claim 1 wherein filtering the speed signal includes filtering the speed signal according to one of a first set of filter coefficients and a second set of filter coefficients.

5. The method as recited in claim 4 wherein determining the mode of operation of the speed control system includes determining if a set vehicle speed is being selected by the speed control system and wherein filtering the speed signal includes filtering the speed signal according to the first set of filter coefficients upon determining a slow acceleration status.

6. The method as recited in claim 5 wherein the first set of filter coefficients is based on a first cut-off frequency.

7. The method as recited in claim 5 wherein filtering the speed signal includes filtering the speed signal according to the second set of filter coefficients upon determining a quick acceleration status and the set vehicle speed mode being selected by the speed control system.

8. The method as recited in claim 7 wherein the second set of filter coefficients is based on a second cut-off frequency, lower than the first cut-off frequency.

9. The method as recited in claim 1 further comprising:

determining a desired speed of the vehicle according to the speed control system;

determining a current speed error between the desired speed and the filtered speed at a current sample interval;

determining a previous speed error between the desired speed of the vehicle and the filtered speed signal at a previous sample interval;

determining a difference between the current speed error and the previous speed error; and comparing the difference with a predetermined threshold; and limiting the current speed error if the difference exceeds the predetermined threshold to provide smooth transitions of the filtered speed signal during changes in operation mode or acceleration status.

10. The method as recited in claim 9 wherein controlling the speed of the vehicle includes controlling the speed based on the desired speed of the vehicle and one of the current speed error and the limited current speed error.

11. A speed control system for processing a speed signal for controlling a speed of a vehicle, the system comprising:

a sensor for sensing a speed of the vehicle and generating a corresponding speed signal; and a control unit operative to determine an acceleration status of the vehicle based on the speed signal, the acceleration status being one of quick and slow, determine a mode of operation of the speed control system, the mode of operation including a set vehicle speed, accel, and coast, filter the speed signal based on the acceleration status and the mode of operation to reduce driver perceived error between a vehicle speed indicated by a speedometer and a desired speed of the speed control system, and generate a corresponding filtered speed signal, and control the speed of the vehicle based on the filtered speed signal.

12. The system as recited in claim 11 wherein the control unit is further operative to preliminarily filter the speed signal to eliminate noise in the speed signal.

13. The system as recited in claim 12 wherein the control unit, in preliminarily filtering the speed signal, is further operative to perform a moving average on the speed signal.

14. The system as recited in claim 11 wherein the control unit, in filtering the speed signal, is further operative to filter the speed signal according to one of a first set of filter coefficients and a second set of filter coefficients.

15. The system as recited in claim 14 wherein the control unit, in determining the mode of operation of the speed control system, is further operative to determine if a set vehicle speed is being selected and wherein, in filtering the speed signal, the control unit is further operative to filter the speed signal according to the first set of filter coefficients upon determining a slow acceleration status.

16. The system as recited in claim 15 wherein the first set of filter coefficients is based on a first cut-off frequency.

17. The system as recited in claim 15 wherein the control unit, in filtering the speed signal, is further operative to filter the speed signal according to the second set of filter coefficients upon determining a quick acceleration status and a set vehicle speed being selected.

18. The system as recited in claim 17 wherein the second set of filter coefficients is based on a second cut-off frequency, lower than the first cut-off frequency.

19. The system as recited in claim 11 wherein the control unit, in controlling the speed of the vehicle, is further operative to determine a desired vehicle speed, determine a current speed error between the desired speed and the filtered speed at a current sample interval, determine a previous speed error between the desired speed of the vehicle and the filtered speed signal at a previous sample interval, determine a difference between the current speed error and the previous speed error, compare the difference with a predetermined threshold, and limit the current speed error if the difference exceeds the predetermined threshold.

20. The system as recited in claim 19 wherein the control unit, in controlling the speed of the vehicle, is further operative to control the speed of the vehicle based on the desired speed of the vehicle and one of the current speed error and the limited current speed error.

21. A method for controlling speed of a vehicle to reduce driver perceived speed deviation from a desired target set speed displayed by a speedometer and a set speed used by a vehicle speed control system, the method comprising:

filtering a vehicle speed signal using a first filter having a slow response when a command is received by the vehicle speed control system; and filtering the vehicle speed signal using a second filter having a fast response to control the speed of the vehicle to the set speed after receiving the command to reduce driver perceived speed deviation between the speed corresponding to the command and the speed displayed by the speedometer.

22. The method of claim 21 further comprising:

limiting speed error between subsequent samples to provide smooth transitions between use of the first and second filters.

23. A method for controlling speed of a vehicle to reduce driver perceived speed deviation from a desired target set speed displayed by a speedometer and a set speed used by a vehicle speed control system, the method comprising:

determining acceleration of the vehicle;

filtering a vehicle speed signal using a first filter if the acceleration of the vehicle is below a predetermined threshold;

filtering the vehicle speed signal using a second filter otherwise; and controlling speed of the vehicle based on the filtered speed signal.

* * * * *